(12) United States Patent
Ito

(10) Patent No.: US 8,078,064 B2
(45) Date of Patent: Dec. 13, 2011

(54) COHERENT OPTICAL RECEIVER AND ADJUSTMENT METHOD THEREOF

(75) Inventor: Toshiharu Ito, Minato-ku (JP)

(73) Assignee: NEC Corporation, Tokyo (JP)

( * ) Notice: Subject to any disclaimer, the term of this patent is extended or adjusted under 35 U.S.C. 154(b) by 338 days.

(21) Appl. No.: 12/398,896

(22) Filed: Mar. 5, 2009

(65) Prior Publication Data

US 2009/0226189 A1  Sep. 10, 2009

(30) Foreign Application Priority Data

Mar. 6, 2008  (JP) .................... 2008-055716

(51) Int. Cl.
  *H04B 10/06*  (2006.01)
(52) U.S. Cl. ......... 398/202; 398/208; 398/209; 398/210
(58) Field of Classification Search .......... 398/202–209, 398/212, 213

See application file for complete search history.

(56) References Cited

U.S. PATENT DOCUMENTS

| | | | | |
|---|---|---|---|---|
| 4,824,201 A | * | 4/1989 | Kazovsky ................ | 398/185 |
| 5,365,335 A | * | 11/1994 | Sorin ...................... | 356/479 |
| 5,777,764 A | * | 7/1998 | Kohn ....................... | 398/178 |
| 6,600,594 B1 | * | 7/2003 | Ko et al. ................. | 359/337 |
| 7,012,697 B2 | * | 3/2006 | McAlexander et al. ...... | 356/484 |

FOREIGN PATENT DOCUMENTS

| | | |
|---|---|---|
| JP | 2001-249053 A | 9/2001 |
| JP | 2004-147323 A | 5/2004 |

OTHER PUBLICATIONS

Kazuro Kikuchi, "Phase-Diversity Homodyne Detection of Multi-level Optical Modulation With Digital Carrier Phase Estimation", IEEE Journal of Selected Topics in Quantum Electronics, Jul./Aug. 2006, pp. 563-570, vol. 12, No. 4.

C. Laperle, et al., "Wavelength Division Multiplexing (WDM) and Polarization Mode Dispersion (PMD) Performance of a Coherent 40Gbit/s Dual-Polarization Quadrature Phase Shift Keying (DP-QPSK) Transceiver", PDP16.pdf, 2007, pp. 1-3.

C.R.S. Fludger, et al., "10×111 Gbit/s, 50 GHz spaced, POLMUX-RZ-DQPSK transmission over 2375 km employing coherent equalisation", PDP22.pdf, 2007, pp. 1-3.

* cited by examiner

*Primary Examiner* — Nathan Curs
*Assistant Examiner* — Tanya Ngo
(74) *Attorney, Agent, or Firm* — Sughrue Mion, PLLC

(57) ABSTRACT

In a coherent optical receiver, a light intensity value of signal light providing an optimum reception state is determined when ideal signal light free from waveform distortion is used as the signal light in a state where local-oscillator light is turned on. A first amplitude value of an analog electrical signal corresponding to the signal light is stored in a storage section, wherein the first amplitude value is obtained at a time when the ideal signal light of the light intensity value determined is used as the signal light in a state where the local-oscillator light is turned off. Light intensity of the signal light is determined so as to make a second amplitude value equal to the first amplitude value, wherein the second amplitude value is an amplitude value of the analog electrical signal which is obtained at a time when actual signal light is used as the signal light in a state where the local-oscillator light is turned off.

10 Claims, 5 Drawing Sheets

COHERENT OPTICAL RECEIVER AND ADJUSTMENT METHOD THEREOF

BACKGROUND OF THE INVENTION

1. Field of the Invention

This application is based upon and claims the benefit of priority from Japanese Patent Application No. 2008-055716, filed on Mar. 6, 2008, the disclosure of which is incorporated herein in its entirety by reference.

The present invention relates to an optical transmission system and, more particularly, to a coherent receiver and a method for adjusting the coherent receiver.

2. Description of the Related Art

Optical transmission systems, which use optical fiber as a transmission medium, play an essential role in trunk communication networks, for their excellent long-distance and large-capacity transmission performances. In many of optical transmission systems provided for practical use, a signal to be transmitted is superposed onto signal light by intensity modulation. Specifically, a digital binary (1/0) signal is assigned light ON/OFF. In part of the latest optical transmission systems in which the transmission rate is more than 10 Gb/s, a scheme is used by which the superposition of a signal is performed by using phases, not the intensities. In this case as well, conversion to a signal with two intensity levels is performed by optical processing at a receiving terminal before the signal is received.

Optical communication using a two-intensity-level signal is easy to implement but is not always the best in performance. Nonetheless, such systems of two-intensity-level signal type have continued to be the main stream, and a factor for making this possible is that optical amplifiers have become commercially practicable. Optical amplifiers, which can linearly amplify signal light directly, became commercially practical in the first half of the 1990s. However, actually, various other different schemes had been studied earlier. Coherent optical transmission schemes are among these schemes.

The coherent optical transmission schemes, by which signal light is combined with local-oscillator (LO) light at a receiving terminal and their beat component is detected by an optical-to-electrical (OE) converter, had been vigorously studied in spite of the structural complexity before optical amplifiers became commercially practical. The reason is that the coherent optical transmission schemes accomplish excellent reception sensitivity. Although the excellence in reception sensitivity has no longer been regarded as an advantage large enough to compensate for the structural complexity since optical amplifiers became commercially practical, the coherent optical transmission schemes still continue to draw attention from different points of view.

As the signal rate of an optical communication system increases to 10 Gb/s, 40 Gb/s, and so on, waveform distortion more easily occurs in signal light due to the interaction between bits in transmission fiber or other places. As a countermeasure, waveform correction processing and the like are needed at an electrical stage after reception. In this case, only information on the intensity of the signal light, provided from an OE converter, is not sufficient in terms of information quantity. In this respect, coherent reception schemes draw attention because information on phases is also obtainable at the same time.

Moreover, as the signal rate increases, more technical problems arise with the fact that a serial signal, in which signals are simply time-division-multiplexed, is processed directly. As a measure for easing the processing rate, development from a two-level signal to a multilevel signal has also been sought. When a multilevel signal is used, it is necessary to electrically perform complex coding/decoding processes involved. The superiority of the coherent reception schemes is also recognized from such a point of view.

As yet, the reported results of experimental studies have not exceeded the feasibility verification level because, in part, of a performance problem with electronic parts for waveform correction processing and decoding processing. However, a variety of studies are being pursued, such as dense wavelength division multiplexing in a WDM transmission system (see K. Kikuchi, "Phase-diversity homodyne detection of multilevel optical modulation with digital carrier phase estimation," IEEE Journal of selected topics in quantum electronics (2006), Vol. 12, No. 4, pp. 563-570), large-scale wavelength dispersion compensation in a 40-Gb/s system (see C. Laperle et al., "Wavelength division multiplexing (WDM) and polarization mode dispersion (PMD) performance of a coherent 40 Gbit/s dual-polarization quadrature phase shift keying (DP-QPSK) transceiver," OFC/NFOEC2007, paper PDP16, 2007), and application to a 100-Gb/s signal (see C. R. S. Fludger et al., "10×111 Gbit/s, 50 GHz spaced, POLMUX-RZ-DQPSK transmission over 2375 km employing coherent equalization," OFC/NFOEC2007, paper PDP22, 2007).

Moreover, JP2004-147323 also discloses a method for adjusting an optical receiver by which the signal-to-noise ratio (SNR) of a heterodyne beat signal is improved. According to the optical heterodyne detection system disclosed in JP2004-147323, an attenuator, which attenuates an input signal, is provided before an optical coupler, which combines the input signal with a LO signal, and an optimum attenuation level is calculated based on a base measured value and sample measured values, wherein the base measured value is the value of an optical detected signal derived only from the LO signal without the input signal being provided, and the sample measured values are the values of optical detected signals derived from the input signals attenuated at different attenuation levels. Moreover, a minimum attenuation level is set such that the input signal will have as large a value as the DC detection voltage limit of an optical detector, thereby preventing the optical detector from saturating.

However, in a coherent optical receiver, input is signal light suffering various waveform distortions or signal light in which individual bits have different amounts of energy. Therefore, the amplitude of the input signal varies with waveform-distorting factors even if the average intensity of the input signal light is fixed. As an example, a description will be given of changes in the waveforms of signal light due to wavelength dispersion.

FIG. 1A is a graph showing signal waveforms output from a transmitter, FIG. 1B is a graph showing signal waveforms after transmission over a 20-km fiber line, FIG. 1C is a graph showing signal waveforms after transmission over a 40-km fiber line, and FIG. 1D is a graph showing signal waveforms after transmission over a 200-km fiber line. Here, it will be described how waveforms (equivalent to 128 bits in total) change when a 40-Gb/s RZ-DQPSK signal is transmitted over an ordinary SMF transmission line (wavelength dispersion value: 17.0 ps/nm/km).

Referring to FIG. 1A, when the signal is in a state of being output from the transmitter, there is no difference in level between the bits. The signals shown in FIGS. 1A to 1D all have the same average intensity. However, it can be understood that, as wavelength dispersion accumulates and causes interactions between preceding and following bits, the waveforms gradually gain local peaks, resulting in the signal whose amplitude is enlarged on the whole.

When an optical signal having such waveform distortions is received, an optical receiver needs to perform compensation for signal waveform distortion through digital signal processing at an electrical stage. In this event, an electrical signal obtained by optical-to-electrical conversion is converted from an analog signal to a digital signal by an analog-to-digital converter (AD converter). To achieve high-sensitivity reception characteristics by performing waveform distortion compensation with high precision, the amplitude of the signal to be input to the AD converter needs to be adjusted so as to uniformly fall into the input dynamic range of the AD converter.

In this event, if the input signal light is only degraded in terms of optical SNR and no great waveform distortion occurs as in cases of existing optical communication systems, an optimum operating environment can be provided in any system by fixing the average intensity of the input signal light. That is, it is possible to allow the input dynamic range of the AD converter to be uniformly used. However, if waveform distortion occurs and, as a result, the signal amplitude varies with systems, then it is necessary to perform optimization for each case.

In cases of coherent optical receivers used for the purpose of compensating for signal waveform distortion through digital signal processing at an electrical stage, there is a possibility that input signal light has various distortions. Accordingly, an optimum operating environment cannot be realized only by simply controlling the intensity of the input signal light to a certain fixed value as described above. That is, if the receiver is optimized suitably to a state of small waveform distortion, a signal input to the AD converter, in an area where the waveform distortion is large, exceeds the input dynamic range of the AD converter, resulting in accurate demodulation being impossible. On the other hand, if the receiver is optimized suitably to waveforms having large distortions, only part of the ability of the AD converter is used when signal light suffering small waveform distortion is input, resulting in the reception performance being degraded.

SUMMARY OF THE INVENTION

Accordingly, an object of the present invention is to provide a coherent optical receiver that can achieve good reception characteristics even if input signal light is suffering various waveform distortions, as well as a method for adjusting the receiver.

According to the present invention, a method for adjusting a coherent optical receiver, includes: determining a light intensity value of signal light providing an optimum reception state when ideal signal light free from waveform distortion is used as the signal light in a state where local-oscillator light is turned on; storing a first amplitude value of an analog electrical signal corresponding to the signal light, wherein the first amplitude value is obtained at a time when the ideal signal light of the light intensity value determined is used as the signal light in a state where the local-oscillator light is turned off; and determining light intensity of the signal light so as to make a second amplitude value equal to the first amplitude value, wherein the second amplitude value is an amplitude value of the analog electrical signal which is obtained at a time when actual signal light is used as the signal light in a state where the local-oscillator light is turned off.

According to the present invention, a device for adjusting a coherent optical receiver, includes: a first storage section for storing a light intensity value of signal light providing an optimum reception state when ideal signal light free from waveform distortion is used as the signal light in a state where local-oscillator light is turned on; a second storage section for storing a first amplitude value of an analog electrical signal corresponding to the signal light, wherein the first amplitude value is obtained at a time when the ideal signal light of the light intensity value determined is used as the signal light in a state where the local-oscillator light is turned off; and a controller for determining light intensity of the signal light so as to make a second amplitude value equal to the first amplitude value, wherein the second amplitude value is an amplitude value of the analog electrical signal which is obtained at a time when actual signal light is used as the signal light in a state where the local-oscillator light is turned off.

According to the present invention, it is possible to achieve good reception characteristics even if input signal light is suffering various waveform distortions.

DETAILED DESCRIPTION OF THE PREFERRED EMBODIMENTS

1. Structure

Figure 1A:
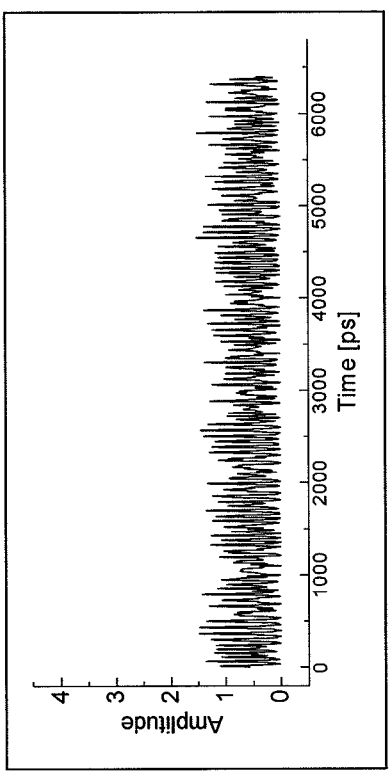
FIG. 1A is a graph showing signal waveforms output from a transmitter.
Figure 1B:
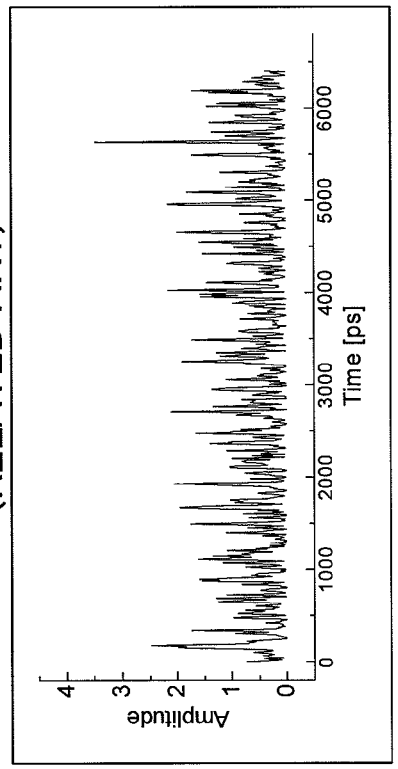
FIG. 1B is a graph showing signal waveforms after transmission over a 20-km fiber line.
Figure 1C:
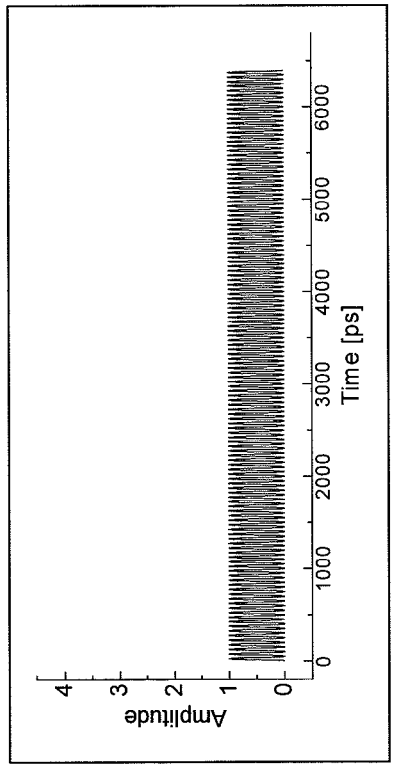
FIG. 1C is a graph showing signal waveforms after transmission over a 40-km fiber line.
Figure 1D:
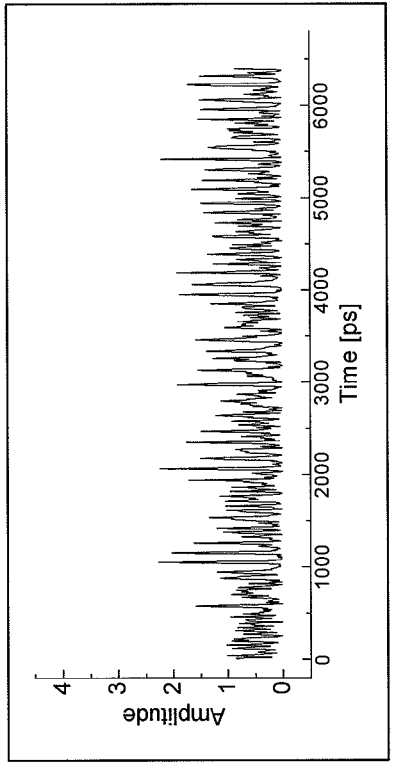
FIG. 1D is a graph showing signal waveforms after transmission over a 200-km fiber line.
Figure 2:
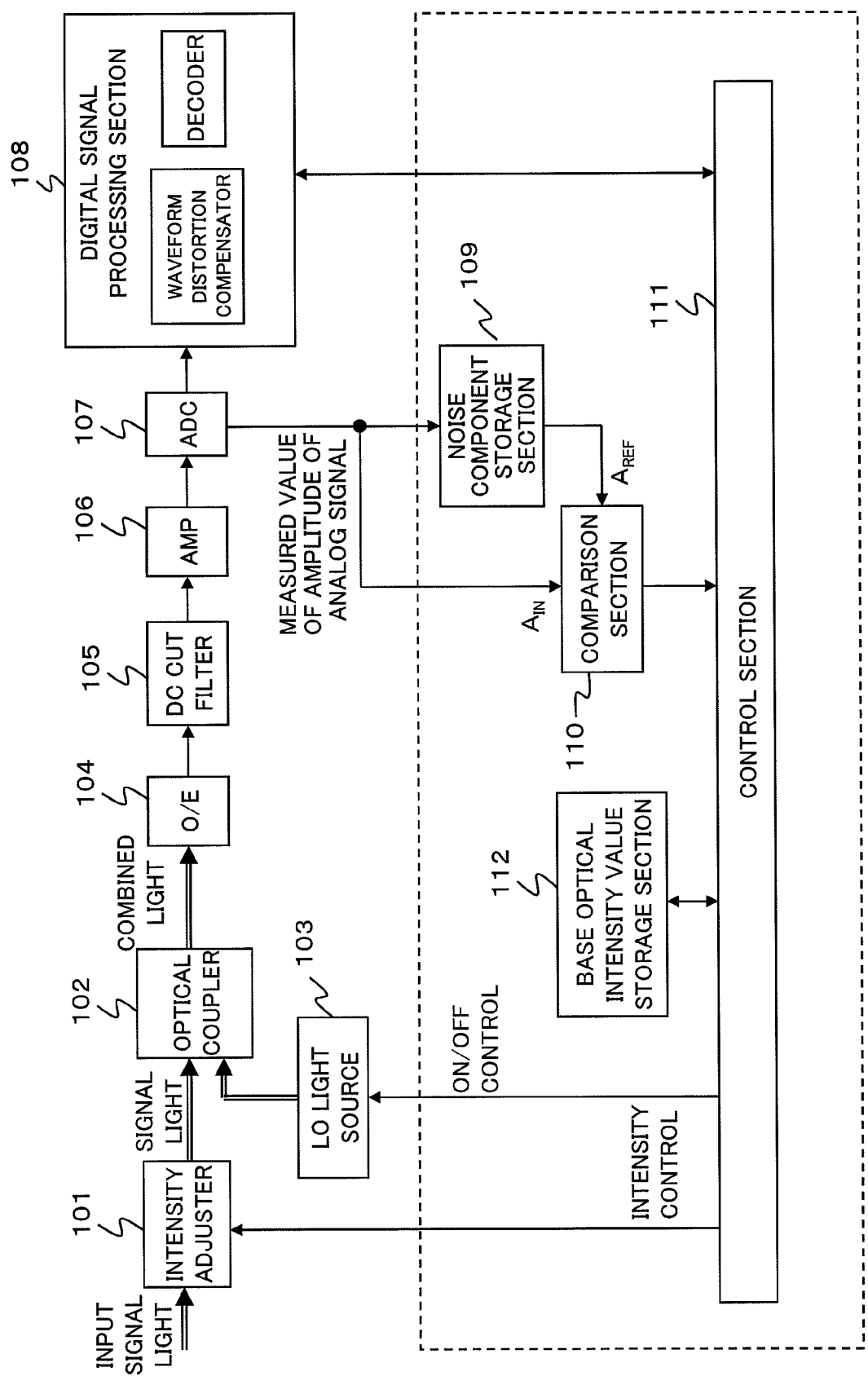
FIG. 2 is a block diagram showing a functional structure of a coherent optical receiver according to an exemplary embodiment of the present invention.

FIG. 2 is a block diagram showing a functional structure of a coherent optical receiver according to an exemplary embodiment of the present invention. An intensity adjuster 101 adjusts the intensity of input signal light that has arrived at the coherent optical receiver after passing through an optical transmission line such as an optical fiber line, and outputs the signal light to an optical coupler 102. The optical coupler 102 combines this signal light with local-oscillator (LO) light input from a LO light source 103 and outputs combined light to an optical-to-electrical (OE) converter 104.

The OE converter 104 converts the received combined light into an electrical signal and outputs the electrical signal to a direct-current (DC) cut filter 105. After a DC component is removed from this electrical signal by the DC cut filter 105, the electrical signal is amplified by an amplifier 106 and then input to an analog-to-digital (AD) converter 107. The amplifier 106 amplifies the electrical signal from which a DC component has been removed so that the electrical signal will be an analog signal at levels suitable for input to the AD converter 107. The AD converter 107 outputs a digital signal, which is then input to a digital signal processing section 108 and subjected to signal processing such as, for example, waveform distortion compensation and decoding.

According to the present exemplary embodiment, the digital signal output from the AD converter 107 in itself is used as the measured value of the amplitude of the analog signal input to the AD converter 107. As will be described later, an amplitude measured value $A_{REF}$, which is the measured value of the amplitude of an analog signal derived from ideal input signal light with LO light in an off state, is stored in a noise component storage section 109. A comparison section 110 compares an amplitude measured value $A_{IN}$, which is the measured value of the amplitude of an analog signal derived from actual input signal light with LO light in an off state, with the stored amplitude measured value $A_{REF}$ and outputs the result of this comparison to a control section 111. In addition, as described later, the control section 111 stores a base optical intensity value in a storage section 112.

The control section 111, while referring to the result of the comparison input from the comparison section 110, controls an intensity-adjusting value at the intensity adjustor 101 so that the amplitude measured value $A_{IN}$ will approach the amplitude measured value $A_{REF}$, which will be described in more detail later. Further, the control section 111 also controls the emission/extinction of light from the LO light source 103, that is, performs ON/OFF control on the LO light source 103.

There are three parameters in total that can be used to adjust the intensity of the analog signal to be input to the AD converter 107. Specifically, the three parameters are the intensity of the signal light, the intensity of the LO light, and the gain of the amplifier 106. In terms of implementation, the easiest way to adjust the intensity of the analog signal is to adjust the input levels by controlling the gain of the amplifier 106. However, it is not easy to meet all of the following features of the coherent reception scheme: a wide range of operating frequency, high gain, and a wide range of gain variability. Moreover, the intensity of the LO light, in view of its function, should not be actively changed. Accordingly, when adjusting the input levels to be input to the AD converter 107, it is preferable to control, in order of precedence, the intensity of the signal light, the gain of the amplifier 106, and then the intensity of the LO light.

In addition, the analog signal to be input to the AD converter 107 contains two components. One of the components is a beat component of the signal light and LO light. This component is a signal component to be used for signal demodulation. The other one is a reception component of the signal light itself. This component is a noise component, from the viewpoint of signal demodulation. Since these beat component (signal component) and noise component are inseparable, setting their relative intensity in an appropriate range is also as important as adjusting the intensity of the analog signal to be input to the AD converter 107.

Here, there is a correlation between the amplitude of the beat component of the signal light and LO light and the amplitude of the reception component of the signal light itself. That is, the reception component is proportional to the square of the beat component and is in a one-to-one correspondence with the beat component. According to the present exemplary embodiment, such relationship is used to adjust the intensity of the analog signal to be input to the AD converter 107.

2. Operation 2.1) Determination of Base Optical Intensity Value

First, the base value of the intensity of signal light (hereinafter, referred to as base optical intensity value) in the coherent optical receiver is set before operation is started. The base optical intensity value is a signal light intensity that, when signal light is free from waveform distortion, brings about an optimum received state of the signal light. Additionally, when the base optical intensity value is determined, the relative intensity between the beat component (signal component) of the signal light and LO light and the reception component of the signal light itself is also determined. Incidentally, the base optical intensity value is a value dependent on many parameters such as the modulation/demodulation method used in the receiver, signal rate, allowable intensity of the LO light, and performance of the amplifier 106.

Figure 3:
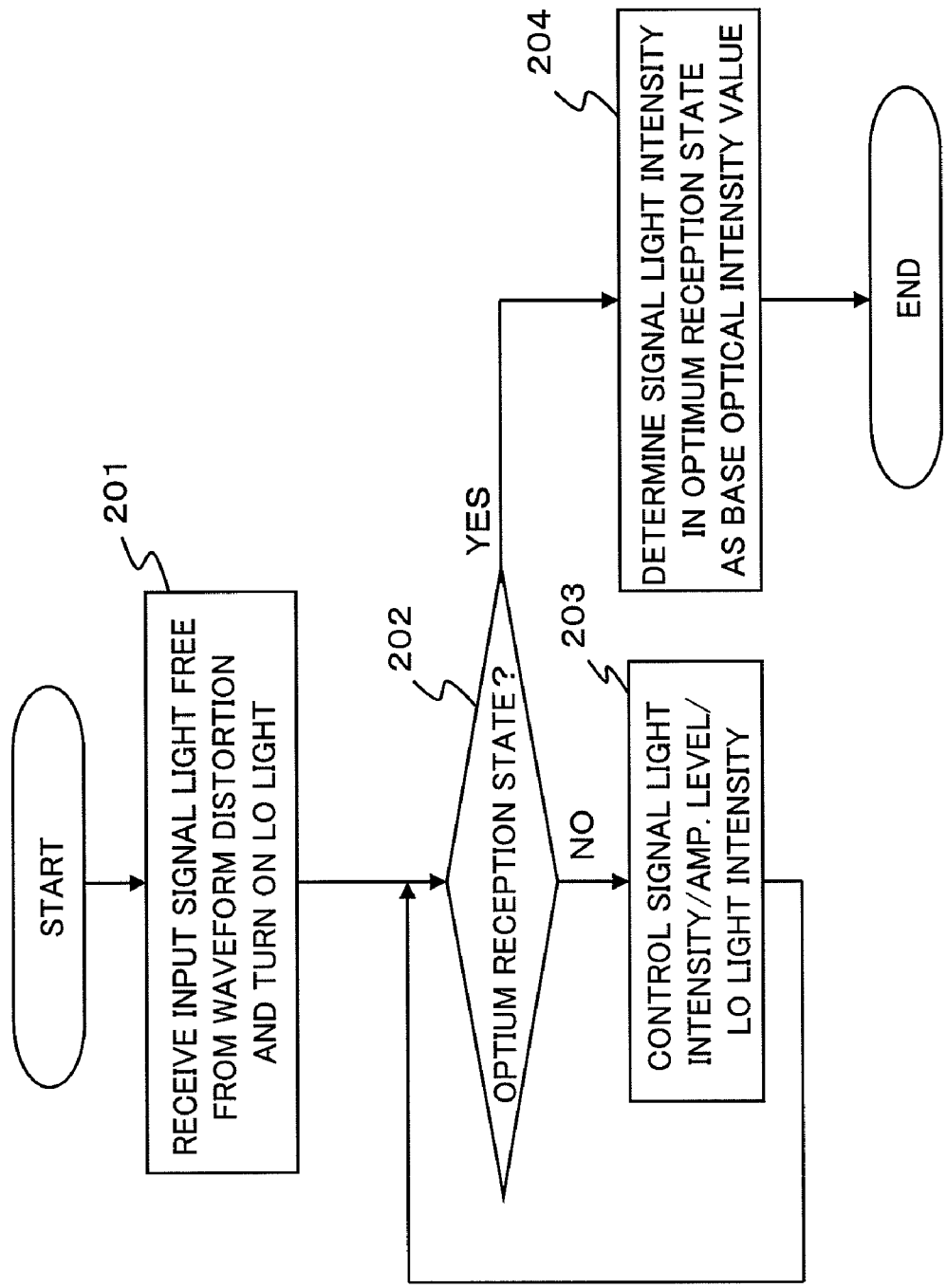
FIG. 3 is a flowchart showing a method for determining a base optical intensity value according to the present exemplary embodiment.

FIG. 3 is a flowchart showing a method for determining the base optical intensity value according to the present exemplary embodiment. First, input signal light free from waveform distortion is input to the coherent optical receiver, and, at the same time, the control section 111 allows the LO light source 103 to output LO light to the optical coupler 102 (Step 201). In this state, the control section 111 controls the intensity-adjusting value at the intensity adjuster 101 so that the signal light will be in the optimum received state (Steps 202 and 203). Alternatively, the gain of the amplifier 106 and/or the intensity of the LO light from the LO light source 103 may be controlled instead as described above. The optimum received state is a state in which the amplitude of the analog signal to be input to the AD converter 107 uniformly falls into the input dynamic range of the AD converter 107.

When the signal light is in the optimum received state (Step 202: YES), the control section 111 determines the then intensity of the signal light (specifically, the intensity-adjusting value at the intensity adjuster 101) as the base optical intensity value and stores it in the storage section 112 (Step 204). With the base optical intensity value thus stored, the measurement of the noise component is performed, which will be described next.

2.2) Measurement of Noise Component

Figure 4:
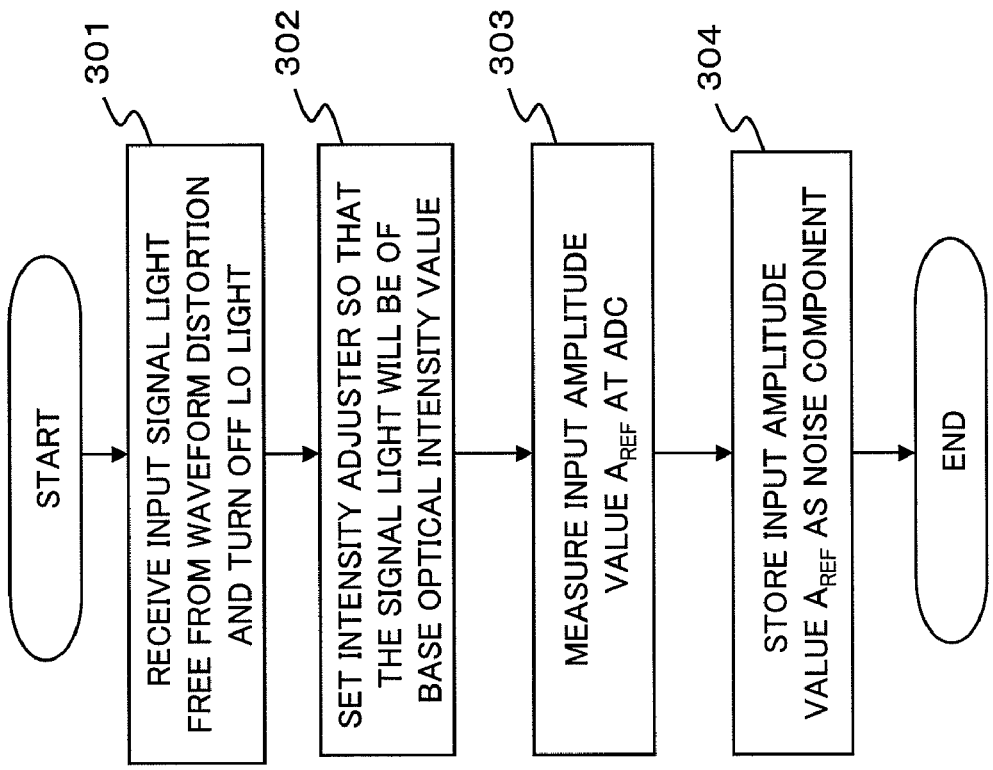
FIG. 4 is a flowchart showing a method for measuring a noise component according to the present exemplary embodiment.

FIG. 4 is a flowchart showing a method for measuring the noise component according to the present exemplary embodiment. First, input signal light free from waveform distortion is input to the coherent optical receiver, and, at the same time, the control section 111 turns off the LO light source 103 (Step S301). The control section 111 sets the intensity-adjusting value at the intensity adjuster 101 for the determined base optical intensity value (Step 302).

In this state, the signal light of the base optical intensity value is input to the optical coupler 102, from which combined light obtained with LO light in an off state is output. The combined light is then converted into an electrical signal by the OE converter 104. Thereafter, as described above, a DC component is removed from the electrical signal by the DC cut filter 105, and the electrical signal, as an analog signal amplified by the amplifier 106, is input to the AD converter 107. The AD converter 107 outputs, as a digital signal, the amplitude measured value $A_{REF}$ of the analog signal that corresponds only to the signal light (Step 303). The control section 111 stores the amplitude measured value $A_{REF}$ output from the AD converter 107 in the noise component storage section 109 (Step 304).

In this manner, the input amplitude measured value $A_{REF}$ (first amplitude value), which is the measured value of the amplitude of an analog signal obtained at the AD converter 107 when input signal light free from waveform distortion is input in a state where the LO light is turned off, is stored as the noise component in the noise component storage section 109. Subsequently, a method for setting the input intensity in actual operation will be described.

2.3) Adjustment of Coherent Optical Receiver

Figure 5:
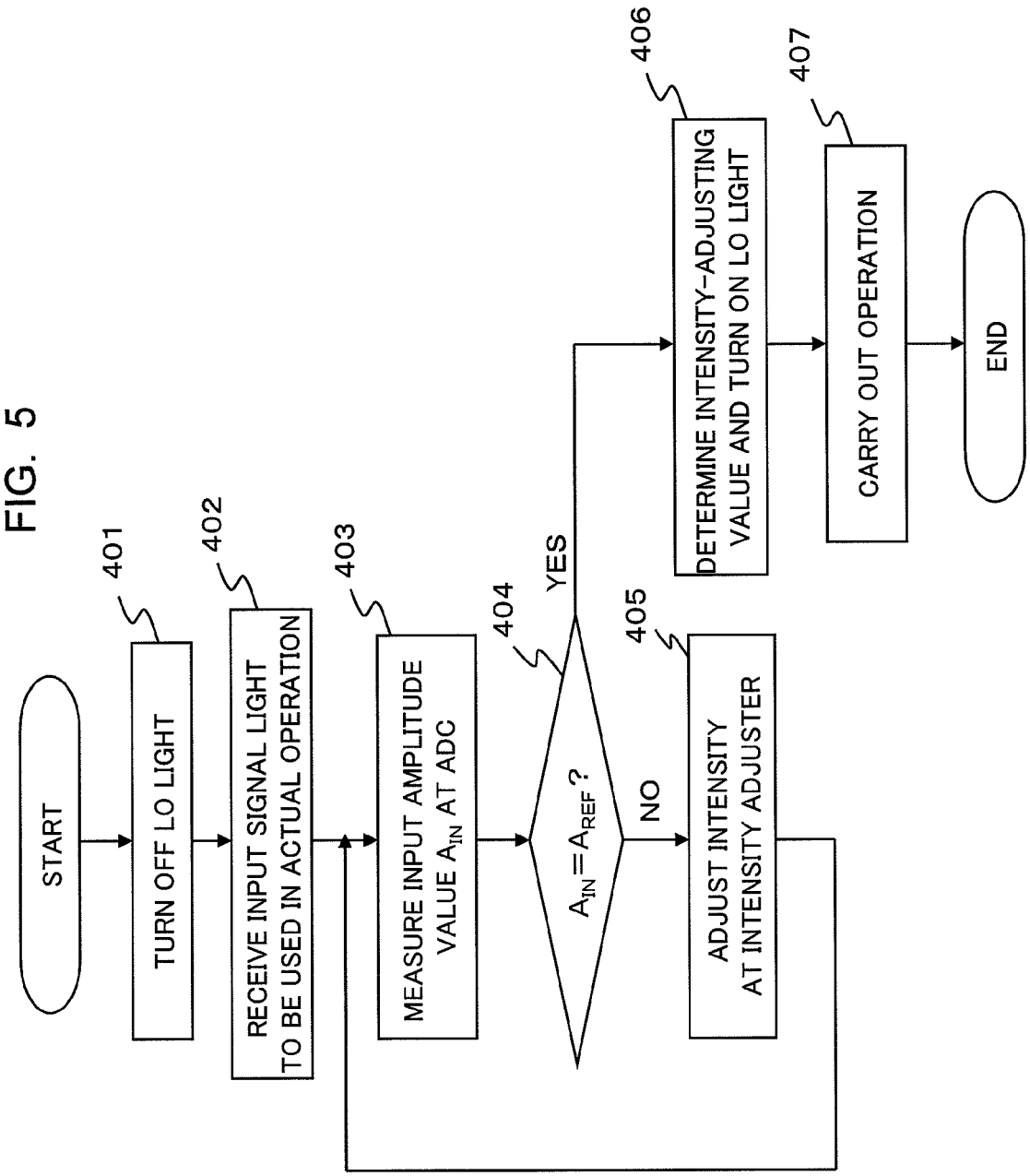
FIG. 5 is a flowchart showing a method for adjusting the coherent optical receiver according to the present exemplary embodiment.

FIG. 5 is a flowchart showing a method for adjusting the coherent optical receiver according to the present exemplary embodiment. As described above, the input amplitude measured value $A_{REF}$ (first amplitude value), obtained at the AD converter 107 when input signal light free from waveform distortion is input in a state where the LO light is turned off, is stored in the noise component storage section 109.

First, the LO light source 103 is turned off (Step 401), and input signal light to be used in actual operation is input to the coherent optical receiver (Step 402). In this state, the AD converter 107 outputs, as a digital signal, the amplitude measured value $A_{IN}$ (second amplitude value) of an analog signal that corresponds only to the signal light to be used in actual operation (Step 403). The comparison section 110 compares the input amplitude measured value $A_{REF}$ (first amplitude value) and the amplitude measured value $A_{IN}$ (second amplitude values) measured this time (Step 404) and notifies the control section 111 of the result of this comparison.

When $A_{REF} \neq A_{IN}$ (Step 404: NO), the control section 111 changes the intensity-adjusting value at the intensity adjuster 101 in the direction in which the amplitude measured value $A_{IN}$ (second amplitude value) will match the input amplitude measured value $A_{REF}$ (first amplitude value) (Step 405). The comparison section 110 compares the input amplitude measured value $A_{REF}$ (first amplitude value) and the amplitude measured value $A_{IN}$ (second amplitude values) of an analog signal corresponding to signal light after adjustment. The steps 403 to 405 are repeated until the amplitude measured value $A_{IN}$ substantially becomes equal to the input amplitude measured value $A_{REF}$ within a predetermined range.

When $A_{REF} = A_{IN}$ (Step 404: YES), the control section 111 fixes the then intensity-adjusting value at the intensity adjuster 101 and turns on the LO light source 103 to allow it to output LO light to the optical coupler 102 (Step 406). Thus, the amplitude of an analog signal to be input to the AD converter 107 is made equal to the amplitude obtained when optimization is performed with input signal light free from waveform distortion. It is possible to receive actual signal light in this optimum operating state (Step 407).

Incidentally, the reception component (noise component) of the signal light itself needs to be set small in comparison with the beat component (signal component) of the signal light and LO light. Therefore, it may be difficult for the AD converter 107, with its ability, to identify the amplitude of the reception component (noise component) of the signal light itself. In this case, when the base optical intensity value of the intensity of signal light to be input is determined, the amplitude $A_{REF}$ of the noise component is observed in a state where, with the LO light source 103 being turned off, the intensity of the signal light is increased (for example, ten times the base optical intensity value) by the intensity adjuster 101. At the time of optimization, the intensity of input signal light is adjusted while referring to the enlarged amplitude $A_{REF}$ of the noise component and then is reduced to one tenths, whereby it is possible to hedge against the deficiency in the identification ability of the AD converter 107.

The above-described adjustment functions of the comparison section 110 and the control section 111 can also be implemented by executing programs on a program-controlled processor such as a CPU.

2.4) Effects

As described above, input signal light free from waveform distortion is input, and in that state, a reception environment (the intensity of the signal light, the intensity of the LO light, the gain of the amplifier 106, or the like) is optimized. In this state, LO light is turned off, and an input signal obtained in this state where only signal light is input, is input to the AD converter 107. The intensity distribution of the input signal is measured by the AD converter 107 itself. When actual input signal light containing distortion is received, the signal light is input with LO light being turned off, and the intensity of the input signal light is adjusted so that the intensity distribution of a corresponding signal to be input to the AD converter 107 will be identical to the intensity distribution obtained at the time of optimization using signal light free from distortion.

As described above, by applying the present exemplary embodiment to a coherent optical receiver including a digitization process performed by the AD converter 107 in a signal demodulation process, it is possible to achieve such digitization that the input dynamic range of the AD converter 107 is uniformly used irrespective of factors such as waveform distortion of input signal light. Thus, it is possible to provide a coherent optical receiver having good reception characteristics even if input signal light is suffering various waveform distortions.

The present invention can be applied to devices on the receiving side of an optical transmission system and particularly can be used for general coherent optical receivers including a digitization process performed by an AD converter in a signal demodulation process.

The present invention may be embodied in other specific forms without departing from the spirit or essential characteristics thereof. The above-described exemplary embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. An optical receiver comprising:
an intensity adjuster for adjusting intensity of input signal light to output intensity-adjusted signal light, wherein the input signal light is signal light received from an optical transmitter through an optical transmission line;
a local-oscillation light source for generating local-oscillation light, wherein the local-oscillation light source is capable of ON-OFF controlling the local-oscillation light;
a combiner for combining the intensity-adjusted signal light and the local-oscillation light to output combined light;
a converting section for converting the combined light to an electrical signal;
an amplitude measuring section for measuring an amplitude of the electrical signal; and
a controller for controlling an intensity-adjusting value of the intensity adjuster so as to make a first amplitude value and a second amplitude value equal to each other, wherein the first amplitude value is an amplitude value of the electrical signal which is obtained at a time when waveform-distortion-free signal light is used which is equivalent to output light of the optical transmitter in a state where the local-oscillation light is turned off and the second amplitude is an amplitude value of the electrical signal which is obtained at a time when the received signal light is used in a state where the local-oscillation light is turned off.

2. The optical receiver according to claim 1, wherein the controller determines a base optical intensity value of the signal light providing an optimum reception state by using the local-oscillation light and the waveform-distortion-free signal light, turns off the local-oscillation light in a state where the signal light matches the base optical intensity value, and then the first amplitude value and the second amplitude value are measured by the amplitude measure section.

3. The optical receiver according to claim 2, wherein the controller determines the base optical intensity value by controlling at least the intensity-adjusting value of the intensity adjuster.

4. The optical receiver according to claim 3, wherein the converting section comprises:
- a DC-cut filter for cutting a direct-current component from the electrical signal obtained by optical-to-electrical conversion; and
- an amplifier for electrically amplifying an electrical signal outputted by the DC-cut filter,
- wherein the controller determines the base optical intensity value by controlling the intensity-adjusting value, a gain of the amplifier, and intensity of the local-oscillation light in order of precedence.

5. A method for adjusting a coherent optical receiver, the coherent optical receiver including:
- an intensity adjuster for adjusting intensity of input signal light to output intensity-adjusted signal light, wherein the input signal light is signal light received from an optical transmitter through an optical transmission line;
- a local-oscillation light source for generating local-oscillation light, wherein the local-oscillation light source is capable of ON-OFF controlling the local-oscillation light;
- a combiner for combining the intensity-adjusted signal light and the local-oscillation light to output combined light;
- a converting section for converting the combined light to an electrical signal; and
- an amplitude measuring section for measuring an amplitude of the electrical signal, the method for adjusting the coherent optical receiver comprising:
- measuring a first amplitude value which is an amplitude value which is an amplitude value of the electrical signal which is obtained at a time when waveform-distortion-free signal light is used which is equivalent to output light of the optical transmitter in a state where the local-oscillation light is turned off;
- measuring a second amplitude value which is an amplitude value of the electrical signal which is obtained at a time when the received signal light is used in a state where the local-oscillation light is turned off; and
- controlling an intensity-adjusting value of the intensity adjusting means so as to make the first amplitude value and the second amplitude value equal to each other.

6. The method according to claim 5, wherein the first amplitude value and the second amplitude value are measured
- after determining a base optical intensity value of the signal light providing an optimum reception state by using the local-oscillation light and the waveform-distortion-free signal light and turning off the local-oscillation light in a state where the signal light matches the base optical intensity value.

7. The method according to claim 6, wherein the base optical intensity value is determined by controlling at least the intensity-adjusting value of the intensity adjuster.

8. The method according to claim 7, wherein the converting section comprises:
- a DC-cut filter for cutting a direct-current component from the electrical signal obtained by optical-to-electrical conversion; and
- an amplifier for electrically amplifying an electrical signal t outputted by the DC-cut filter,
- wherein the base optical intensity value is determined by controlling the intensity-adjusting value, a gain of the amplifier, and intensity of the local-oscillation light in order of precedence.

9. A non-transitory computer-readable medium containing executable instructions for a computer to function as a device for adjusting a coherent optical receiver, the coherent optical receiver comprising:
- an intensity adjuster for adjusting intensity of input signal light to output intensity-adjusted signal light, wherein the input signal light is signal light received from an optical transmitter through an optical transmission line;
- a local-oscillation light source for generating local-oscillation light, wherein the local-oscillation light source is capable of ON-OFF controlling the local-oscillation light;
- a combiner for combining the intensity-adjusted signal light and the local-oscillation light to output combined light;
- a converting section for converting the combined light to an electrical signal; and
- an amplitude measuring section for measuring an amplitude of the electrical signal, the executable instructions of the non-transitory computer-readable medium comprising:
- measuring a first amplitude value which is an amplitude value of the electrical signal which is obtained at a time when waveform-distortion-free signal light is used which is equivalent to output light of the optical transmitter in a state where the local-oscillation light is turned off;
- measuring a second amplitude value which is an amplitude value of the electrical signal which is obtained at a time when the received signal light is used in a state where the local-oscillation light is turned off; and
- controlling an intensity-adjusting value of the intensity adjusting means so as to make the first amplitude value and the second amplitude value equal to each other.

10. The non-transitory computer-readable medium according to claim 9, wherein the first amplitude value and the second amplitude value are measured
- after determining a base optical intensity value of the signal light providing an optimum reception state by using the local-oscillation light and the waveform-distortion-free signal light and
- turning off the local-oscillation light in a state where the signal light matches the base optical intensity value.

* * * * *

UNITED STATES PATENT AND TRADEMARK OFFICE
CERTIFICATE OF CORRECTION

| | | |
|---|---|---|
| PATENT NO. | : 8,078,064 B2 | Page 1 of 1 |
| APPLICATION NO. | : 12/398896 | |
| DATED | : December 13, 2011 | |
| INVENTOR(S) | : Toshiharu Ito | |

It is certified that error appears in the above-identified patent and that said Letters Patent is hereby corrected as shown below:

In the Claims:

Column 9, Line 36: In Claim 5, after "value" delete "which is an amplitude value"

Column 10, Line 7: In Claim 8, after "signal" delete "t"

Signed and Sealed this
Fifth Day of August, 2014

Michelle K. Lee
*Deputy Director of the United States Patent and Trademark Office*